D. T. BOWEN.
LOCKING CONTRIVANCE.
APPLICATION FILED APR. 24, 1914.
1,123,078.
Patented Dec. 29, 1914.
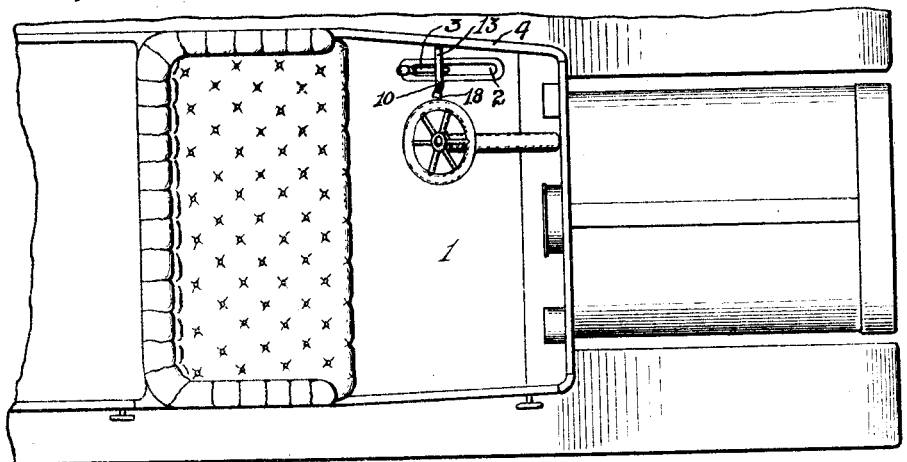
Fig. I.
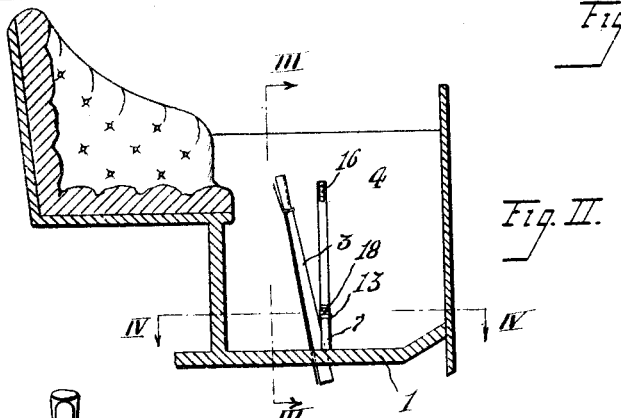
Fig. II.
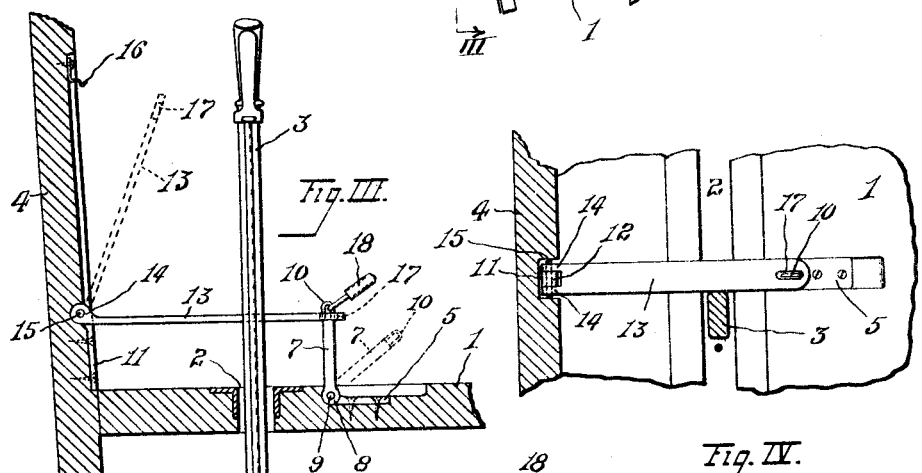
Inventor:
Dana T. Bowen
by his Attorney
Witnesses:

UNITED STATES PATENT OFFICE.

DANA T. BOWEN, OF CLEVELAND, OHIO.

LOCKING CONTRIVANCE.

1,123,078.   Specification of Letters Patent.   Patented Dec. 29, 1914.

Application filed April 24, 1914. Serial No. 834,109.

*To all whom it may concern:*

Be it known that I, DANA T. BOWEN, a citizen of the United States, residing at Cleveland, in the county of Cuyahoga and State of Ohio, have invented a new and useful Improvement in Locking Contrivances, of which the following is a specification, the principle of the invention being herein explained and the best mode in which I have contemplated applying that principle, so as to distinguish it from other inventions.

My invention in locking contrivances is especially adapted for the control levers of automobiles and more particularly for the single hand lever such as is employed in "Ford" cars and which is designed and intended to effect when in its rearmost position a complete locking of the machine. Accordingly my contrivance coöperates to lock such lever in a fixed position and so preclude its unauthorized release to a forward or unbraked position.

A further object is the provision of a simple, durable and economical construction which is permanently attached which may be quickly operated and readily swung aside when not required.

My inventive conception is associated with means which are hereinafter explained and variously combined in the claims.

While the annexed drawing and particular description thereof, set forth in detail the preferred form embodying my invention, it should be understood that the means only exemplifies one of many diversified mechanical forms with which the principle of my invention may be properly applied.

Figure I is a top plan of the forward part of a Ford automobile. Fig. II is a vertical longitudinal section thereof looking toward the left of the car. Fig. III is an enlarged transverse section taken on line III—III of Fig. II and looking forwardly. Fig. IV is a section on line IV—IV of Fig. II looking downwardly. Fig. V is an end view of certain parts shown in Fig. III.

Only so much of the automobile as is essential to an understanding of the manner in which my contrivance is to be attached, will be referred to. Accordingly, the forward floor has been designated by the numeral 1, and it is provided along its left side with a longitudinally extending slot 2, through which the single operating lever 3 projects upwardly for ready manipulation by the driver of the car. The left side of the car body extends upwardly from the floor 1 and has been assigned the reference character 4. Ford automobiles for which my locking contrivance is especially adapted, are so designed that when the lever 3 is pulled beyond neutral and toward its rearward position, the propulsion of the car is precluded not only by disconnection with the engine but by setting of the brakes. If, therefore, an attachment is provided capable of firmly maintaining the lever 3 in its rearward position and a locking agency furthermore provided, any unauthorized operation of the car becomes impossible.

Secured to the floor 1 adjacent the right side of the slot 2 and somewhat forwardly of the normal rearmost position of the lever 3, is a support 5. This support 5 is secured to the floor in any suitable manner to lie, if desired, partially flush therewith as shown in Fig. III. The support 5 is provided with an upwardly projecting bearing 6 having longitudinally extending horizontal openings. A bracket 7 is provided at one end with a pair of forked extensions 8, each of which is provided with an opening adapted to register with the opening in the bearing 6 and effect a hinged connection through the medium of a pin 9. In this manner the bracket 7 may be swung upwardly toward the side 4 as suggested by dotted lines in Fig. III. The upper extremity of the bracket 7 is provided with a looped eye 10 for a purpose to be presently explained.

Secured to the side 4 near the floor 1 is another support 11 which is similarly provided with a bearing 12 having a longitudinally extending horizontal opening. The arm 13 is also likewise provided at one end with a pair of forked extremities 14, each provided with an opening and both adapted to register with the opening in the bearing 12 whereby the support 11 and arm 13 may be connected by a pin 15. In this manner the arm 13 is hinged to the bearing 12 whereby it may be swung upwardly against the side 4 and held against the same by a catch 16; or swung downwardly across the front of the lever 3. The free extremity of the arm 13 is provided with a slot 17 adapted to permit the insertion therethrough of the eye 10. The length of the arm 13 is moreover such that when the bracket 7 is in its upright position, such intersection between the arm 13 and bracket 7 may be accomplished. The actual locking of the contrivance is thereafter effected by means of any suitable type of padlock 18.

While the operation of my contrivance is doubtless already manifest, it may be stated that when the car is traveling both the bracket 7 and the arm 13 may be swung out of the way to lie in suitable recesses in the floor 1 and side 4 respectively. When the owner plans to alight and leave his car standing for a considerable period of time, the lever 3 is drawn to its rearward position and the locking connection of the bracket 7 and arm 13 brought about, whereby the release movement of the lever 3 is positively precluded.

My invention being thus described with sufficient thoroughness, what I desire to secure by Letters Patent and therefore claim specifically, is:

1. A locking contrivance comprising the combination with a lever, a support extending upwardly at one side of the path of movement of said lever, a member projecting upwardly on the opposite side of said lever, a second member movably connected to said support and adapted to cross the path of movement of said lever to meet the other member, and means for securing the extremity of said movable member to said projecting member for the useful purpose specified.

2. A locking contrivance comprising the combination with a lever of a pair of members independently hinged on opposite sides of the path of movement of said lever, said members being adapted to meet to obstruct the lever, and means for securing said members to each other.

3. A locking contrivance comprising the combination with a lever and two supports angularly disposed with reference to each other, and one such support with reference to the path of movement of said lever; a member secured to one of said supports, a second member movably secured to the other of said supports, said second member adapted to cross the path of movement of said lever and meet the other member, and means for fastening said members to each other.

4. A locking contrivance comprising the combination with a lever, of a pair of members movable respectively in the same plane as, and transversely with respect to, the plane of movement of said lever, one of said members adapted to obstruct the movement of the lever, and means for fastening the free extremities of said members to each other.

5. A locking contrivance comprising the combination with two supports angularly disposed with reference to each other and a lever; of a bracket hinged to one such support, an arm hinged to the other of said supports, said arm adapted to extend across the path of movement of said lever and meet said bracket, and means for fastening said bracket and arm to each other.

6. A locking contrivance comprising the combination with an upwardly projecting lever, of a bracket movably supported adjacent thereto and adapted to extend upwardly, and an arm movably supported on the opposite side of said lever and adapted to project across the path of movement thereof to meet said bracket, and means for connecting said bracket and arm.

7. A locking contrivance comprising the combination of a lever, a pair of supports on opposite sides of the path of movement thereof, each of said supports being provided with a recess, a pair of members hinged to said supports respectively and each adapted to occupy one of such recesses, one of said members being furthermore adapted to extend across the path of movement of said lever to meet the other, and means for securing the extremities of the members to each other.

Signed by me, this 22nd day of April, 1914.

DANA T. BOWEN.

Attested by—
WILLIAM C. BRACKEN,
MARY COLEMAN.